Patented Jan. 18, 1949

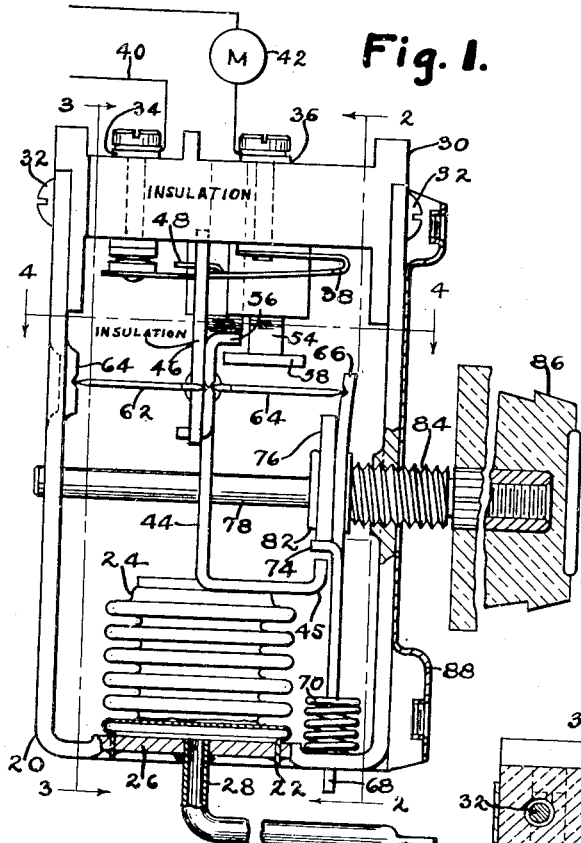

2,459,522

UNITED STATES PATENT OFFICE 2,459,522

SWITCH FOR REFRIGERATING APPARATUS

Albert O. Grooms, Dayton, Ohio, assignor to General Motors Corporation, Dayton, Ohio, a corporation of Delaware Application October 30, 1944, Serial No. 560,996

3 Claims. (Cl. 200—83)

This invention is related in one specific aspect to refrigerating apparatus, but more properly to controls such as may be used for refrigerating apparatus and countless other applications.

My Patent No. 2,231,532, issued February 11, 1941, is a typical prewar refrigerator controls. While it was considered simpler and less expensive than its predecessors there were certain expensive parts and constructions therein. Some of these expensive parts and constructions are the bellows mounting construction and the frame and switch mechanism. The setting of the switch following manufacture was also a problem.

It is an object of my invention to provide an improved control which has a durable simple and inexpensive bellows, frame and tube construction.

It is another object of my invention to provide a simple independent adjustment for both the opening and closing position.

Essentially these objects are obtained by employing a simple U-shaped frame having a large aperture in its yoke which receives the open end of the bellows. The opening in the open end of the bellows is closed by a plug containing an aperture over which the end of the capillary tubing is placed and soldered. The plug as well as the open end of the bellows and the frame are joined and sealed by a single solder joint. A block of insulating material is fastened between the legs of the U and supports a simple switch mechanism which is connected directly by a bellows follower to the bellows. Separate screws threaded in the insulating block serve as simple adjusting stops which engage the bellows follower to limit its movement in opposite directions to provide a simple independent and inexpensive opening and closing adjustment for the control.

Further objects and advantages of the present invention will be apparent from the following description, reference being had to the accompanying drawings, wherein a preferred form of the present invention is clearly shown.

In the drawings:

Fig. 1 is a view in elevation of a refrigerator control embodying one form of my invention;

Fig. 2 is a sectional view taken along the line 2—2 of Fig. 1;

Fig. 3 is a sectional view taken along the line 3—3 of Fig. 1; and

Fig. 4 is a sectional view taken along the line 4—4 of Fig. 1.

Referring now to the drawings, there is shown a refrigerator control with a simple U-shaped frame 20 having in the yoke portion thereof a large aperture which receives the rim 22 at the open end of the copper bellows 24. Within the rim 22 there is provided a plug 26 which may be formed of the disk which is punched out of the frame 20 to make the large aperture therein. This plug or disk 26 is provided with a small aperture therein providing access to the interior of the bellows 24. Over this aperture there is bonded the end of the capillary tubing 28 by soldering or some other suitable method. The opposite end of this capillary tubing ordinarily is pinched off and sealed by soldering. This end is ordinarily clamped to the evaporator of the refrigerating system. Prior to sealing the end of the capillary tubing, the tubing 28 as well as the interior of the bellows 24 is charged with a suitable fluid, such as sulphur dioxide or methyl-chloride as is well known in the art.

Between the legs of the U-shaped frame 20 there is provided a block 30 of electrical insulating material which is held in place by the screws 32 passing through apertures in the frame and threaded into the block. Preferably molded in the block 30 are the terminal members 34 and 36 which are threaded to receive the terminal screws on the upper or outer face of the block. The inner end of the terminal member 36 has a leaf spring member 38 riveted to it. The other end of this leaf spring member 38 is provided with a contact which is located in alignment with a contact provided upon the inner end of the terminal 34. The terminal 34 is connected by its terminal screw to one supply conductor 40 while the terminal 36 is connected by its terminal screw to a motor 42 which may be used to drive the compressor of a refrigeratnig system.

Soldered or otherwise secured to the bellows 24 is one end of the bellows follower 44 which extends toward the leaf spring 38. This bellows follower 44 has a portion 46 of electrical insulating material which is riveted or otherwise secured to the portion 44. This insulating portion 46 is provided with a slot which hooks the mid-portion of the leaf spring member 38. The leaf spring member 38 is provided with a small tongue 48 which engages a notch (hidden by the spring 38 in Fig. 2) in the slot of the insulating member 46 to lock this leaf spring member 38 in the slot in the insulating member 46.

The metal portion of the bellows follower 44 is provided with a projection 50 shown in Fig. 2, as being in engagement with the inner end of an adjusting stop screw 52 which is threaded in a threaded aperture 54 extending entirely through the insulating block 30. This stop screw is provided with a screw-driver slot or other type of head such as Allen head, so that it may be adjusted to change the stopping point of the bellows follower in the closed position to vary the opening point of the switch mechanism. The bellows follower member 44 is provided with a second lateral projection 56 which is positioned so as to engage the enlarged head 53 of an adjusting screw 60 threaded in a threaded aperture extending through the insulating block 30 to its outer face. This screw 60 is likewise provided with a screw slot or Allen, or some other type of head, within the insulating block. This screw 60 may be turned to change the stopping point of the bellows follower in the open position of the switch mechanism so as to vary the closing point of the switch.

To cause the switch to operate with a snap action, the bellows follower portion 44 is provided with a pair of notches receiving the hardened knife edges provided at the adjacent ends of the toggle links 62 and 64. The outer end of the toggle link 62 is also provided with a hardened knife edge which is received in a notch provided in a boss 64 formed in the side wall of the frame. The toggle link 64 is likewise provided with a hardened knife edge at its outer end which is received in a notch in the upper end of the spring bar 66. This spring bar 66 at its lower end is provided with a tongue 68 which rides in a slot in the yoke of the frame 20 at one side of the bellows 24. On either side of the tongue 68 acting against shoulders on the spring bar 66 are compression coil springs 70 and 72 which serve to urge this spring bar 66 upwardly, so that a tongue 74, which is struck out from it is always held against the surface of the cam 76.

This cam 76 has a splined aperture which is fitted upon a splined portion of the rotatable shaft 78. The shaft 78 extends through a slot 80 in the bellows follower portion 44 and is slidably and rotatably mounted in an aperture provided in the left leg of the frame 20. The cam 76 is provided with a projection 77 for engaging an arm 45 projecting from the vertical portion of the bellows follower 44 to lock the bellows follower and the switch contacts in the open circuit position in the extreme clockwise position of the cam 76. The cam 76 is held in place by a C-shaped key 82 which extends into a slot provided at the end of the splined portion of the shaft 78. The shaft 78 is provided with an enlarged threaded portion 84 providing a shoulder which bears against the spring bar 66 as shown in Figs. 1 and 4. This threaded portion 84 is threaded through a flange-threaded aperture provided in the right leg of the frame 20. The shaft 78 is rotated by an adjusting knob 86.

The control is enclosed by a generally U-shaped sheet metal member 88 which serves as a removable case. This member 88 extends over the right leg of the frame 20 and encloses all of the parts within the rectangular space provided by the frame and the insulating block 30.

While I have chosen to illustrate my invention by a refrigerator control having a single set of switch contacts, it is applicable to all sorts of controls whether they operate one or more sets of switch contacts or one or more valves.

While the form of embodiment of the invention as herein disclosed, constitutes a preferred form, it is to be understood that other forms might be adopted, as may come within the scope of the claims which follow.

What is claimed is as follows:

1. A bellows-operated control comprising a U-shaped metal frame, a block of electrical insulating material extending between the ends of the legs of the U-shaped frame and fastened thereto, a switch mechanism mounted upon the in-turned side of the block and having terminals extending through the block to one of the other faces; a metal bellows fastened to the yoke of the frame, a bellows follower operatively connecting said bellows and said switch mechanism, and a range adjusting means mounted upon one of the legs of the U-shaped frame for acting upon the bellows follower to vary the range of the control.

2. A bellows operated control comprising a support, a control device mounted upon said support, a bellows mounted upon said support, a bellows follower extending directly between and connecting said bellows and said control device, a spring means for controlling the movement of the bellows follower, a cam for adjusting the tension of said spring means, said bellows follower having an arm projecting adjacent said cam, said cam having a projection for engaging said arm to lock said bellows follower and said control device in one position of said cam.

3. A bellows-operated control comprising a U-shaped metal frame, a block of electrical insulating material extending between the ends of the legs of the U-shaped frame and fastened thereto, a switch mechanism mounted upon the in-turned side of the block and having terminals extending through the block to one of the other faces, a metal bellows fastened to the yoke of the frame, a bellows follower operatively connecting said bellows and said switch mechanism, bearing means provided in each of the legs of said U-shaped frame, and a common adjustment means mounted upon the bearing means of each of said legs for simultaneously adjusting both the opening and closing of said switch means.

ALBERT O. GROOMS.

REFERENCES CITED

The following references are of record in the file of this patent:

UNITED STATES PATENTS

| Number | Name | Date |
| --- | --- | --- |
| 1,507,591 | Frankenberg | Sept. 9, 1924 |
| 1,791,896 | Henning | Feb. 10, 1931 |
| 1,988,848 | Kuhn | Jan. 22, 1935 |
| 2,119,317 | Dasher | May 31, 1938 |
| 2,125,627 | Fonseca | Aug. 2, 1938 |
| 2,291,501 | Persons | July 28, 1942 |

FOREIGN PATENTS

| Number | Country | Date |
| --- | --- | --- |
| 522,503 | Great Britain | June 19, 1940 |